May 2, 1950 H. G. HARTMAN 2,506,082
METHOD AND APPARATUS FOR TRUING CUTTERS
Filed March 19, 1946 3 Sheets-Sheet 1

INVENTOR.
HERBERT GEORGE HARTMAN
BY

May 2, 1950     H. G. HARTMAN     2,506,082
METHOD AND APPARATUS FOR TRUING CUTTERS
Filed March 19, 1946     3 Sheets-Sheet 3

INVENTOR.
HERBERT GEORGE HARTMAN
BY

Patented May 2, 1950

2,506,082

UNITED STATES PATENT OFFICE 2,506,082

METHOD AND APPARATUS FOR TRUING CUTTERS

Herbert G. Hartman, Irondequoit, N. Y., assignor to Gleason Works, Rochester, N. Y., a corporation of New York Application March 19, 1946, Serial No. 655,633

12 Claims. (Cl. 90—1)

The present invention relates to rotary cutters and particularly to inserted blade type face-mill cutters such as are used for cutting spiral bevel and hypoid gears for automotive and other precision industrial purposes.

In order to avoid noise and achieve maximum load-carrying capacity, it is necessary to cut automotive and other precision type gears to an accuracy of within a few thousandths of an inch. This requires, among other things, that in cutting a gear with a face-mill cutter, for instance, the blades of the cutter be at the correct radial distances from the axis about which the cutter rotates within limits measured in hundred-thousandths of an inch.

Aside from the possible noise and reduced load-carrying capacity which may result in the gears produced, if the blades of the cutter are not all at the correct radial distances from the axis of rotation of the cutter, some blades will have to do disproportionate shares of the cutting and will, therefore, dull faster than others, and the cutter will have to be sharpened more frequently than necessary. Moreover, since the blades of a face-mill cutter are relieved back of their side-cutting edges and, therefore, the relieved side surface of each blade is at a progressively varying distance from the axis of the cutter, when one blade is sharpened back, all blades will have to be sharpened back an equal amount so that the new side-cutting edges will all have correct radial distances from the axis of the cutter. Thus, if the blades are not arranged at correct radial distances, and one blade dulls faster than the others, not only is more frequent sharpening required, but a great deal of the useful life of the blades is wasted.

To position the blades of an inserted blade type face-mill cutter at the correct radial distances from the axis of the cutter, it has heretofore been the practice to first true the blades as accurately as possible on a special truing fixture, and then to true them again when the cutter is mounted on the gear cutting machine. This is done not only when the cutter is new, that is, the first time it is used, but in the best practice is done, also, after each sharpening of the cutter.

In truing on the truing fixture, the cutter is secured to the spindle of the fixture and each blade is individually tested to see whether it is at the correct radial distance from the axis of the spindle. If a blade is not in the correct position, the operator changes the shim which is interposed between the blade and the body of the cutter or shifts the wedge which is also interposed between the blade and the body of the cutter. In view of the accuracy with which the blades have to be trued, the truing of the cutter on the truing fixture is sometimes a relatively long, painstaking job, and it requires the skill of the most experienced operator.

As already indicated, for best results, the trueness of the cutter should be checked, also, after it has been mounted on the gear cutting machine. This is desirable and is required for precision work because the axis of the tool spindle of the gear cutting machine may not be absolutely true with the axis of the cutter as trued on the truing fixture. If it is not, then the blades of the cutter will travel in a path eccentric of the axis of the tool spindle as the tool spindle rotates in the cutting operation.

The standard truing fixture is provided with means for locking the cutter against rotation during testing of the radial position of each blade and during adjustment of the radial position of the blade if adjustment is required. Moreover, the truing fixture has means for insuring that blades, which have corresponding side-cutting edges (outside or inside), are tested at corresponding points in their side surfaces so that all may be tested alike. Conventional type gear cutting machines, however, have neither of these features. When he trues the cutter on the gear cutting machine, the operator has heretofore had to rely wholly on his skill to see that he tests corresponding blades at corresponding points along their relieved side surfaces. If he should test one blade at one distance behind its cutting edge and another blade at a different distance behind its cutting edge, he would get different radial readings on his test gauge due to the relief of the side surfaces of the blades back of their side cutting edges, even though the side-cutting edges of the blades themselves were at the correct radial distance from the axis of the cutter.

It is difficult and time-consuming to adjust the blades on a gear cutting machine, for the object of truing is to get all of the blades to track correctly when the cutter rotates, and each blade must be adjusted and correctly positioned with reference to each other blade within an accuracy measured, as already stated, in hundred-thousandths of an inch. Moreover, whatever time is consumed in the truing operation on the cutting machine is time during which a very costly machine is tied up not doing useful work.

One object of the present invention is to provide a faster and more accurate method for truing face-mill cutters and other types of inserted blade tools.

Another object of the invention is to provide a gear cutting machine having means for more quickly and more accurately truing inserted-blade type face-mill cutters on the machine than any such machine previously built.

Another object of the invention is to provide apparatus for truing any type of face-mill cutter, whether inserted blade or integral blade type, on a gear cutting machine so that its blades will run true with the axis of the cutter spindle of the machine.

A further object of the invention is to provide an improved form of face-mill gear cutter which lends itself to more accurate and faster truing.

Another object of the invention is to provide an inserted blade type face-mill cutter which can not only be trued more accurately and faster than previous designs, but in which the blades can be more securely seated in the cutter head.

Still another object of the invention is to provide a face mill gear cutter which can be sharpened more accurately than cutters heretofore made.

Other objects of the invention will be apparent hereinafter from the specification and from the recital of the appended claims.

For truing cutters according to the present invention, a cylindrical disc is secured to or made integral with the body or head of the cutter, and this disc has its periphery ground to be coaxial with the cutter. If the cutter is an inserted blade type cutter, the head itself is first trued with reference to the axis of the spindle of the truing fixture by mounting the head loosely on the spindle of the truing fixture, and rotating the spindle of the truing fixture to pass the periphery of the disc under the contact finger of a gauge, and shifting the cutter head bodily with reference to the spindle until the gauge reads zero for a complete revolution of the head. The periphery of the disc, and, therefore, the axis of the cutter head, is then coaxial with the axis of the spindle of the truing fixture. The cutter head is then secured to the spindle. Then the blades themselves are trued with reference to the cutter head in the usual way by testing and adjusting the radial position of each blade until it is at the correct distance from the axis of the spindle of the truing fixture. Then the trued cutter is taken off the spindle of the truing fixture and is mounted loosely on the tool spindle of the gear cutting machine, and this latter spindle is rotated to pass the periphery of the disc under the contact finger of a gauge which is secured to a relatively fixed part of the gear cutting machine. During its rotation, the cutter head is shifted bodily with reference to the tool spindle until the gauge reads zero for a complete revolution of the spindle. The periphery of the disc is then coaxial with the axis of the tool spindle, and the blades are also automatically at the correct radial distances from that axis. Then the cutter head is secured to the tool spindle, and the cutter is ready for use.

With the present invention, it is unnecessary to test and adjust the position of each blade of the cutter radially of the axis of the tool spindle on the gear cutting machine. This time-consuming operation is wholly eliminated. It takes but a second or so to get the periphery of the disc to run true with the axis of the tool spindle, and no adjustment of the blades whatsoever on the gear cutting machine is required.

The disc is not only used for truing the cutter, but may also serve another purpose. Heretofore, the blades of inserted type face-mill gear cutters have been made with shoulders to seat against the face of the cutter head to fix the height to which the cutting portions of the blades may project beyond the face of the cutter head. When a cutter is provided with a truing disc according to the present invention, the blades may be seated against the front face of this disc, and the shoulders on the blades can be eliminated entirely if desired. In any event, they do not need to be made with any particular accuracy. It is much cheaper and much faster to grind the bases of the blades to seat against the front face of a disc, than it is to grind shoulders on blades with the necessary accuracy to seat against the front face of a cutter head. The invention, therefore, provides not only a saving in the time of truing of inserted-blade cutters, but also a saving in the cost of their manufacture and assembly.

The present invention has advantages also in relation to integral blade type cutters. Heretofore, no matter how accurately such cutters might be made, if the blades did not run true with the axis of the cutter spindle, some blades would do more work than others, and, therefore, dull faster than others. Moreover, the gears would not be cut with the accuracy desired because all blades of the cutter would not be cutting. Heretofore, there was no way of truing an integral blade type face-mill cutter on a gear cutting machine. With the present invention, the truing disc is secured to the cutter before its blades are relieved, or it may be made integral with the cutter head. The blades are, therefore, relieved with reference to an axis which coincides with the axis of the disc. When the relieved cutter is placed on the gear-cutting machine, then, it is but a second's work to true the disc with the axis of the tool spindle of the machine and secure the cutter to the spindle in correct position. This insures that all blades will track properly.

The present invention not only insures increased accuracy in cutters through improved truing on the cutting machine, but through improved truing on the sharpening machine. Heretofore, it has not been the practice to true the cutter on the sharpening machine before sharpening its blades. There was no assurance, therefore, that the cutter head might not be very slightly eccentric of the axis of the work spindle of the sharpening machine. With the present invention, it is again but a second's work to true the disc with the axis of the work spindle of the sharpening machine, thus insuring that all blades are sharpened alike and that their cutting edges are all at the correct radial distances from the axis of the cutter.

The present application covers specifically the method of truing cutters according to the present invention and machines on which the cutters are trued and used. The cutters themselves are claimed specifically in my co-pending application Serial No. 673,382, filed May 31, 1946, which is a continuation-in-part of the present application.

Figure 1:
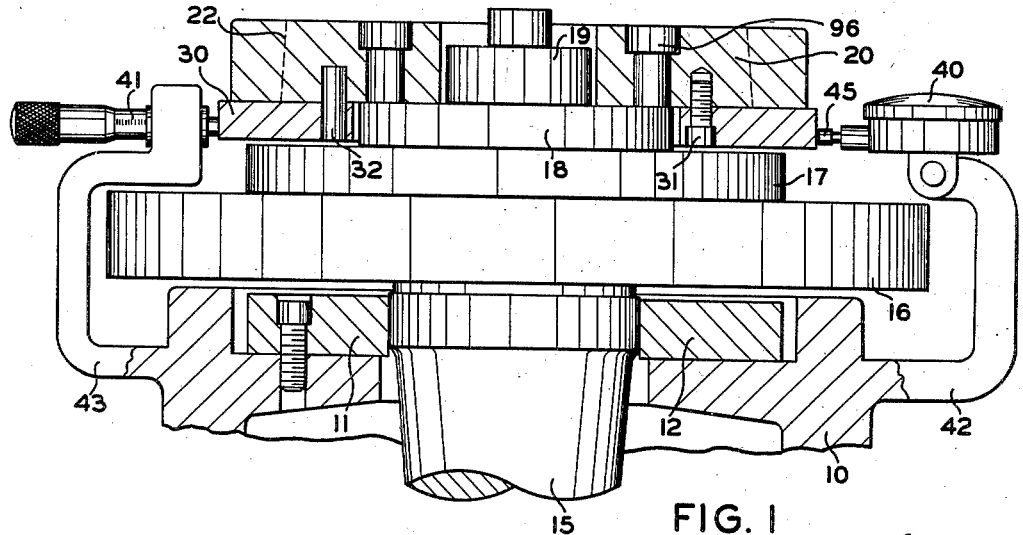
Fig. 1 is a more or less diagrammatic view showing the cutter head of a cutter, which is made according to this invention, mounted on a standard truing fixture, and illustrating the step of truing the cutter head with reference to the spindle of the truing fixture.
Figure 2:
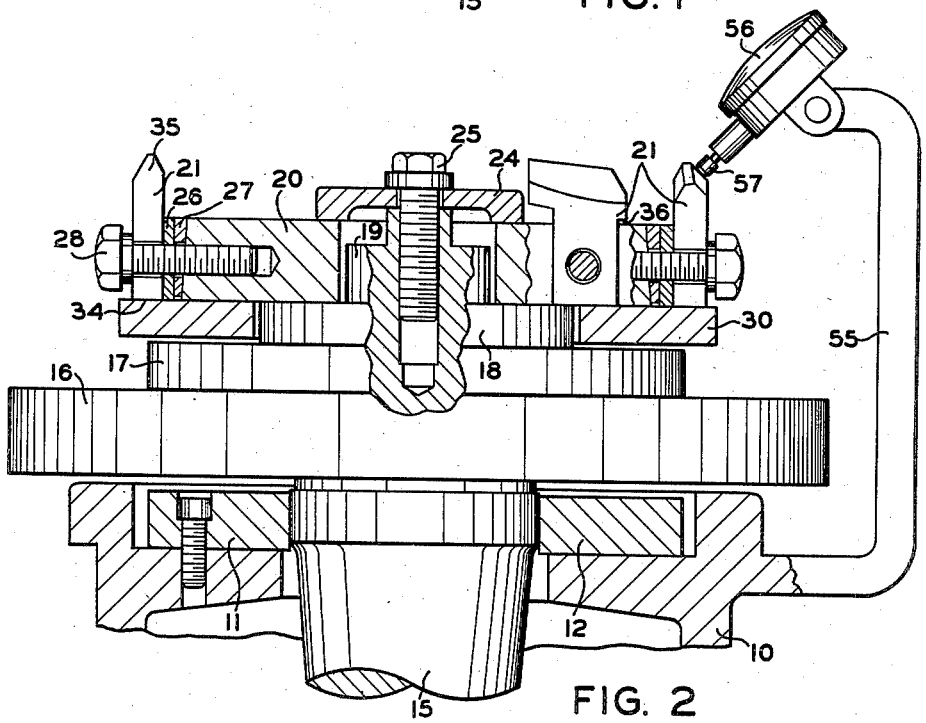
Fig. 2 is a corresponding view showing the blades mounted in the cutter head and the cutter head secured to the spindle of the truing fixture, and illustrating the step of truing the blades of the cutter with reference to the axis of this spindle and of the cutter head.

Referring first to Figs. 1 and 2, 10 denotes the base of a standard truing fixture, such, for instance, as that disclosed in the Gleason et al. patent No. 1,949,014, issued February 27, 1934. 15 denotes the spindle of this fixture, while 11 and 12 are parts of a three-point bearing in which the spindle 15 is journaled. 16, 17 and 18 denote heads or seating portions of different diameters which are integral with the spindle 15 and which serve as seats for face-mill cutters of different diameters. 19 designates the nose of the spindle.

The face-mill cutter shown in the drawings is of medium diameter. The body portion or head of this cutter is designated 20, and 21 denotes its blades. The cutter head is provided in the usual manner with spaced peripheral slots 22 which are adapted to receive the blades 21 and the shims 26 and wedges 27 which are interposed between the blades and the bottoms of the slots. These shims and wedges serve for positioning the blades radially of the axis of the cutter. The blades are secured to the cutter head by screws or bolts 28 which pass through slots in the shanks of the blades and thread into the cutter head.

The cutter shown differs from cutters of conventional design in that it has a cylindrical disc 30 secured to it as by means of screws 31 and the dowel pin 32. The periphery of this disc is ground to be a very accurate cylindrical surface so that it may serve for gauging purposes as will hereinafter be described. This cutter differs, also, from the cutters of previous design in that the bottom faces 34 of its blades 21 seat on the front face of the disc 30. It is this which determines the distance which the cutting portions 35 of the blades project beyond the front face of the cutter head. Heretofore, the blades have been provided with shoulders, similar to the shoulders 36. These shoulders have heretofore seated against the front face of the cutter head to determine the distance of projection of the cutting portions of the blades beyond that face of the cutter head. It is easier, and, therefore, less costly to grind the front face of the disc 30 and the bottom faces 34 of the blades to the accuracy desired than it is to grind shoulders, such as the shoulders 36, to the desired accuracy. Hence, the disc 30, merely as a seating member, provides an improved cutter structure aside from its advantages for truing which will be described in more detail hereinafter.

For the purposes of practicing the present invention, the base 10 of the truing fixture is provided with means for supporting a gage 40 and an adjusting screw 41 at points which are diametrically opposite with reference to the axis of the spindle 15. These supports may be in the form of brackets 42 and 43, respectively. These brackets are in addition to the bracket 55 (Fig. 2) which supports the gauge, which is employed to test the radial positions of the blades. This last-named bracket and gauge may be of the same construction as shown in the Gleason et al. patent mentioned, and the illustration of Fig. 2 is only diagrammatic.

The first step in truing a cutter, according to the present invention, is to mount the cutter head, with or without the blades secured therein, loosely on the spindle of the truing fixture. For this purpose the bore of the cutter head is made slightly larger than the nose 19 of the spindle 15. The bore of the cutter head is simply slipped over the nose 19 of the spindle to allow the back face of the cutter head to rest on the seat 18 of the spindle. The bore of the disc 30 is of sufficient diameter to clear the periphery of the seat, in the case shown, the seat 18, and the height of the disc 30 is less than the height of the seat so that the rear face of the disc is clear of the front face of the next larger seat 17 of the spindle. The gauge 40 is then brought into position where its plunger 45 will contact the periphery of the disc 30, and the spindle 15 is rotated to rotate the disc under the plunger 45. If there is any movement of the plunger 45 recorded by the gauge 40, then the disc 30 and the cutter head 20, to which it is secured, are not coaxial of the spindle 15. In this event, the adjusting screw 41, which in the case shown is a micrometer screw, is engaged with the periphery of the disc 30 and as the spindle 15 rotates, moving the disc 30 under the plunger 45 of gauge 40, the screw 41 is rotated to move the cutter head bodily on the seat 18 of the spindle until a zero reading is obtained on the gauge throughout a complete revolution of the spindle. The periphery of the disc 30 and the cutter head 20 itself are then coaxial of the spindle.

Then, the cutter head is secured to the spindle 15 by the clamping plate 24 and bolt 25 (Fig. 2). The blades 21 are then secured in the cutter head, if they have not previously been mounted in the head. Then, the blades are trued in conventional fashion by gauging the radial position of each in the manner described in the Gleason et al. patent. Thus, corresponding side cutting surfaces of each of the blades 21 may be tested by engaging the plunger 57 of the gauge 56 with the side surface of the blade at or adjacent its cutting edge, and reading the indication on the gauge. All blades have to be tested either at their cutting edges or at corresponding points on the sides of the blades because, as previously stated, the side surfaces of the blades are relieved and are at a constantly changing distance from the axis of the cutter in any plane perpendicular to that axis. If a blade is not in its correct radial position, it can be adjusted to correct position readily by loosening the bolt 28 and moving the wedge 27 or, if necessary, by changing the shim 26. When the truing operation has been completed, all of the blades of the cutter will have the correct radial positions from the axis of the disc 30, which is the axis of the cutter head.

Figure 3:
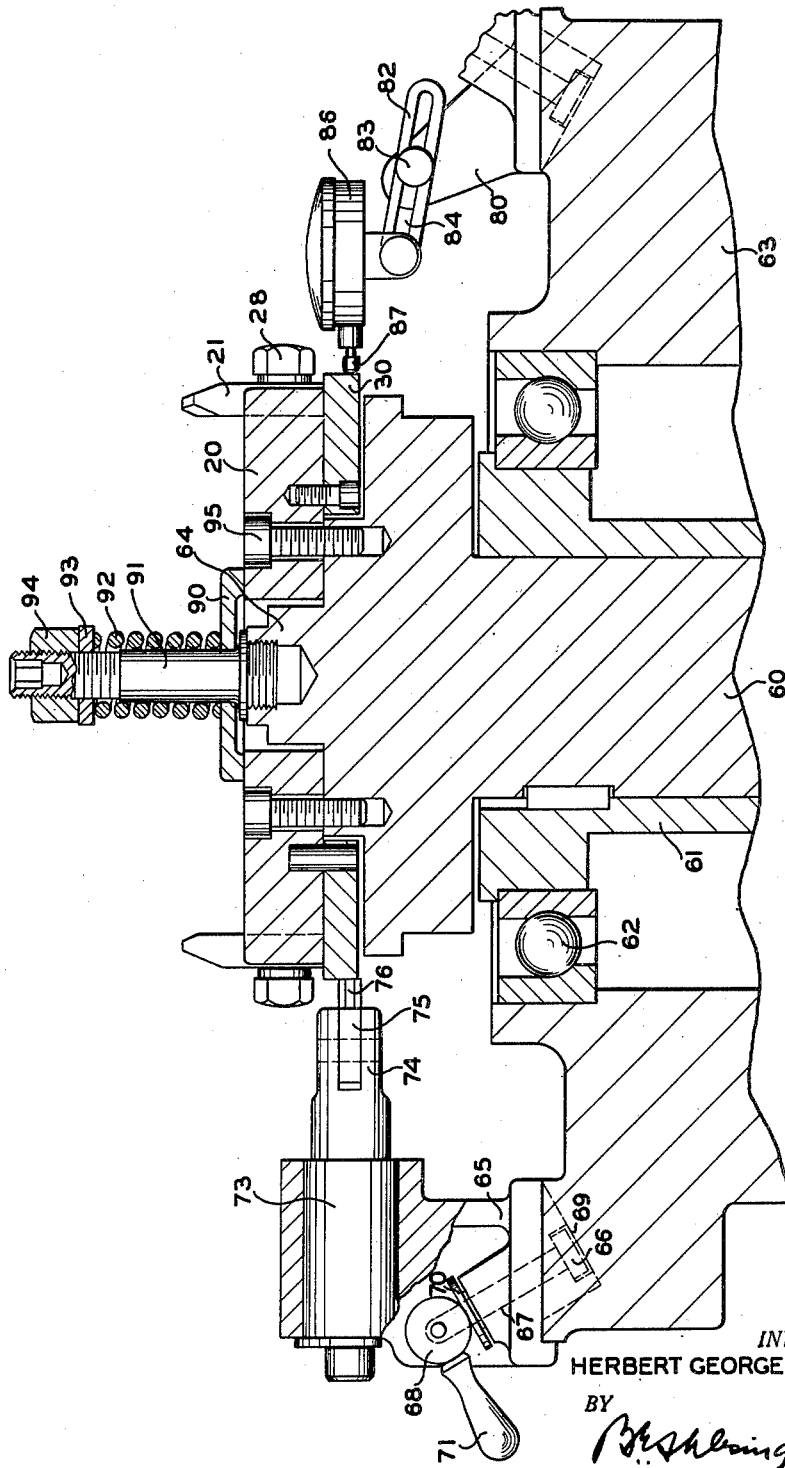
Fig. 3 is a fragmentary sectional view showing the trued cutter mounted on the tool spindle of a face-mill gear cutting machine and illustrating the step of, and showing the means for, truing this cutter with reference to the axis of the tool spindle.
Figure 4:
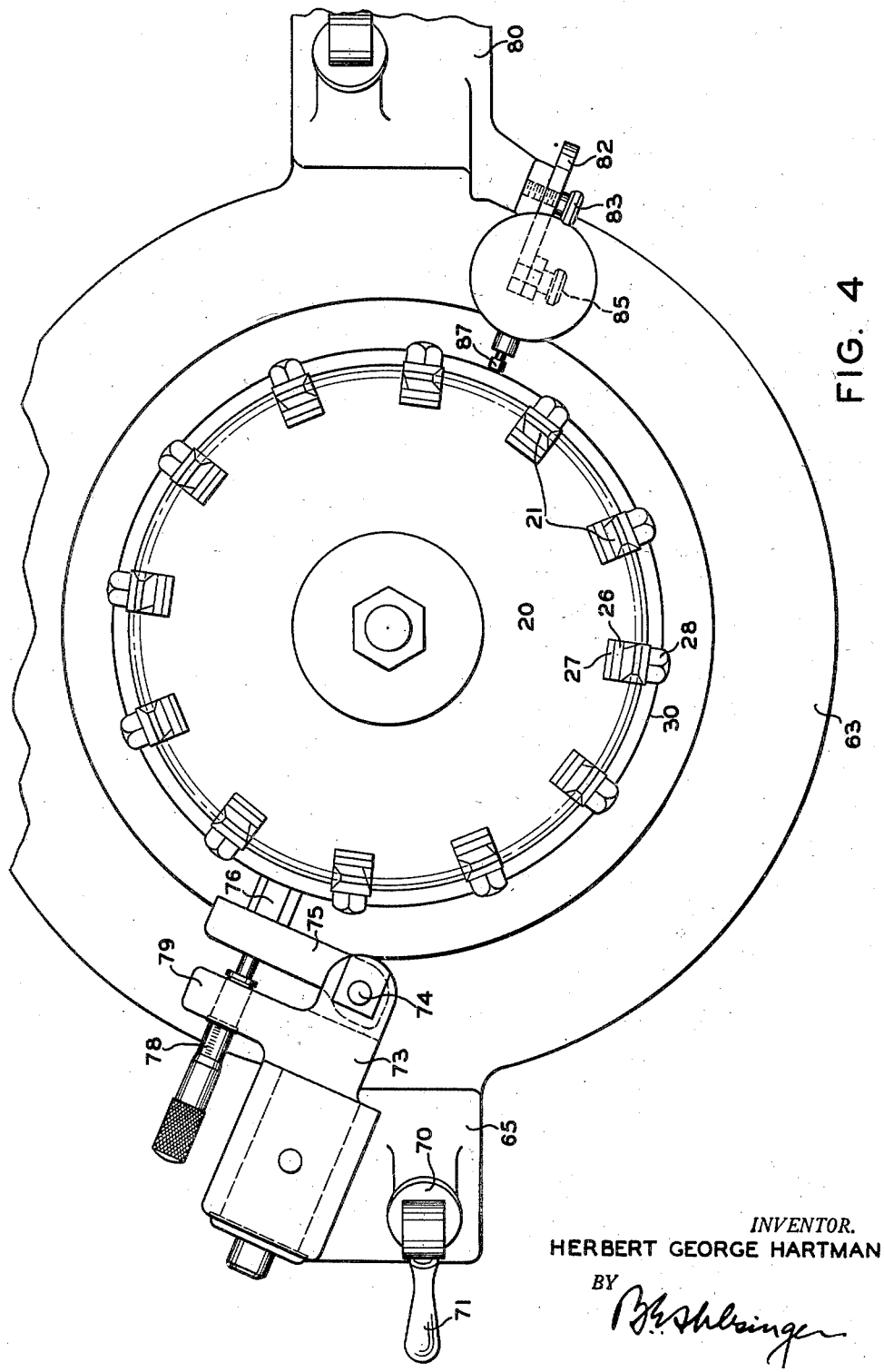
Fig. 4 is a fragmentary plan view of the parts shown in Fig. 3.

The cutter is now placed on the gear cutting machine. A machine is shown more or less diagrammatically in Figs. 3 and 4. The tool spindle is denoted at 60. It is keyed to a sleeve 61 which is journaled by means of the anti-friction bearing 62 in the support 63, which may be the cradle or column of the machine.

Mounted on the front face of the support 63 is a bracket 65 which may be clamped in position by the head 66 of a clamping bar 67. This bar is mounted reciprocably in the bracket 65 and is connected at its outer end to a rotary cam or eccentric member 68. The head 66 is adapted to slide through and be engaged in a slot 69 formed in the support 63, and the periphery of the cam member or eccentric 68 is adapted to engage a pad 70 formed on the front face of the bracket 65, so that when the eccentric 68 is rotated about its axis it will clamp the bracket 65 to the support 63. A handle 71 is provided for rotating the cam or eccentric member 68. Journaled in the bracket 65 is a post 73 and pivotally mounted on this post, as by means of the pin 74, is an arm 75. This arm carries as its free end a hexagonal shaped contact member 76 which is adapted to engage the periphery of the disc 30 when the cutter is positioned on the cutter spindle of the gear cutting machine. The arm 75 is adapted to be moved about its pivot by the screw of a micrometer 78 which is rotatably mounted in a projection 79 of the post 73. This screw engages the back of the arm 75.

Mounted on the face of the support 63 is another bracket 80 which is detachably secured to the support 63 in a manner similar to the bracket 65. The bracket 80 has an arm 82 adjustably secured to it by means of a screw 83 which passes through an elongated slot 84 in the arm. Secured to this arm as by means of screw 85 is a dial gauge 86 whose plunger 87 is adapted to engage the periphery of a disc 30 at a point diametrically opposite the point of engagement with that disc of the contact member 76.

The bore of the cutter head 20 is slightly larger than the nose 64 of the tool spindle 60. In truing a cutter on the gear cutting machine, the head 20 of the cutter is first mounted loosely on the machine, the bore of the cutter head being slipped over the nose 64 of the cutter spindle, and the cutter being held on the spindle under spring pressure by means of a clamping plate 90. This clamping plate is mounted on a stud or post 91 that is threaded into the nose 64 of the spindle 60 and that carries a coil spring 92 which is interposed between the plate 90 and a washer 93. The tension of this spring can be adjusted by the nut 94 which engages the washer and which threads onto the post.

With the cutter thus held on the spindle 60, the plunger 87 of the gauge 86 and the contact member 76 are brought into engagement with diametrically opposite points on the periphery of disc 30. Then, the spindle 60 is rotated to rotate the disc under the plunger 87. If the needle of the gauge 86 moves, the disc 30 and the cutter are eccentric of the axis 69 of the spindle. The micrometer screw 78 is then rotated to move the disc 30 and the cutter, to which it is attached, bodily with reference to the spindle until a zero reading is had on the gauge 86 as the disc 30 revolves under the plunger 87. When this is achieved, the cutter is trued, that is, is coaxial of the tool spindle. The cutter is then bolted to the spindle by passing bolts 95 (Fig. 3) through the bolt openings 96 (Fig. 1) in the cutter head 20 and threading the bolts into the cutter spindle. The post 91 is then unthreaded from the spindle 60 to remove the clamping disc 90 and the other parts, which are carried by the post, from the machine. The gauge 86 and the micrometer carrying post 73 are then swung out of the way, or the brackets 65 and 80 may both be removed from the machine by releasing their clamping bolts and sliding them out of their slots. The machine is then ready for use in cutting a gear.

The steps for truing an integral blade cutter on a gear cutting machine, and the steps for truing either an inserted blade type cutter or an integral blade type cutter on a sharpening machine, prior to sharpening its blades, are similar to those described for truing the cutter on the gear cutting machine. The cutter is loosely mounted on the machine; a gauge and a screw are brought into engagement with diametrically opposite points of the truing disc and the cutter is adjusted until a zero reading is had all around the disc; then the cutter is secured in place.

While the invention has been described in connection with the truing of a face-mill gear cutter, it will be understood that it is applicable to truing of other types of inserted blade cutters, also. For instance, by securing a disc, similar to the disc 30, to a disc-type rotary milling cutter, truing of the blades of such a cutter may be materially expedited. In fact, the invention is applicable to the truing of any type of rotary tool having either inserted or integral blades.

It will be understood, also, that while it has been stated that a micrometer is used for adjusting the cutter during truing, actually any type of screw or other suitable adjusting means may be employed instead. It will further be understood that when reference is made in the specification and claims to adjustment of the cutter until the gauge reads zero for a complete revolution of the truing disc, this means simply adjustment until the gauge hand has a constant reading for a revolution of the truing disc whether the hand actually registers against the zero mark on the scale or against some other mark.

It will be further understood that while a particular embodiment of the invention has been described, the invention is capable of further modification, and the present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having best described my invention, what I claim is:

1. The method of truing a rotary cutting tool, which has a plurality of cutting blades arranged about its axis, on a machine on which the tool is to be mounted, which comprises providing said tool with a truing surface which is a surface of revolution coaxial of the tool, mounting the tool loosely on a rotary spindle of the machine to which the tool is to be secured, rotating the spindle to revolve the truing surface under a gauge to determine if the truing surface is concentric with the axis of the spindle, adjusting the tool bodily radially with reference to the spindle, if necessary, until a zero reading is obtained on the gauge for a complete revolution of the spindle, and then securing the tool fixedly to the spindle.

2. The method of truing a rotary cutting tool, which has a plurality of cutting blades arranged about its axis and a truing surface coaxial with the tool, on a machine on which the tool is to be mounted, which comprises mounting the tool loosely on a rotary spindle of the machine to which the tool is to be secured, operatively engaging a gauge and an adjusting screw with the truing surface at diametrically opposite points of the truing surface, rotating the spindle of the machine to revolve the truing surface under the gauge, adjusting the tool bodily with reference to the spindle, if necessary, by rotation of the screw until a zero reading is obtained on the gauge for a complete revolution of the spindle, and then securing the tool fixedly to the spindle.

3. The method of truing a face-mill gear cutter on a gear cutting machine which comprises providing a cylindrical truing surface on the cutter which is coaxial of the cutter, mounting the cutter loosely on the tool spindle of the machine, operatively connecting a gauge with the truing surface, rotating the cutter to revolve the truing surface under the gauge, adjusting the cutter bodily relative to the tool spindle, if necessary, until the gauge has a zero reading for a complete revolution of the spindle, and then fastening the cutter to the spindle.

4. The method of truing a face-mill gear cutter on a gear cutting machine which comprises providing a cylindrical truing surface on the cutter which is coaxial of the cutter, mounting the cutter loosely on the tool spindle of the machine, operatively engaging a gauge and an adjusting screw at diametrically opposite points of the truing surface, rotating the cutter to revolve the truing surface under the gauge, adjusting the cutter bodily, if necessary, by rotation of the screw until the gauge has a zero reading for a complete revolution of the spindle, and then securing the cutter to the spindle.

5. The method of truing a face-mill gear cutter, which has inserted cutting blades, for use on a gear cutting machine, which comprises providing the cutter with a cylindrical truing surface which is coaxial of the cutter, mounting the cutter loosely on a truing fixture which has a rotary spindle, truing the cutter with reference to said spindle so that the cylindrical truing surface is coaxial of the spindle, then fastening the cutter to the spindle, then testing each blade of the cutter and adjusting it, if necessary, so that it is at the correct radial distance from the axis of the spindle, then securing the blades to the cutter, then mounting the cutter loosely on the tool spindle of the gear cutting machine, and truing the cutter with reference to said spindle so that the cylindrical truing surface is coaxial of the tool spindle, and then fastening the cutter to the tool spindle.

6. The method of truing a face-mill gear cutter which has inserted blades, for use on a gear cutting machine, which comprises providing the cutter with a cylindrical truing surface, mounting the cutter loosely on the rotary spindle of a truing fixture, operatively engaging a gauge with the truing surface, rotating the spindle to revolve the truing surface under the gauge, adjusting the cutter bodily, if necessary, with reference to the axis of the spindle until the gauge has a zero reading for a complete revolution of the spindle, then securing the cutter to the spindle, gauging the radial distances of the blades of the cutter from the axis of the spindle, adjusting the blades in the cutter, if necessary, until they are all at the correct radial distances from their axis, then securing the blades in position, then mounting the cutter loosely on the tool spindle of the gear cutting machine, rotating said tool spindle to revolve the truing surface under a gauge carried by the gear cutting machine, and adjusting the cutter bodily, if necessary, on the spindle until a zero reading is obtained on the gauge for a complete revolution of the tool spindle, and then securing the cutter to the tool spindle.

7. In a gear cutting machine, the combination with a rotary spindle, of a face-mill gear cutter adapted to be loosely mounted thereon and having a cylindrical truing surface secured thereto, of a gauge mounted on the machine and adapted to be operatively engaged with the cylindrical truing surface to gauge the position of said surface as the spindle is rotated, means for adjusting the cutter with reference to the spindle to adjust the position of the axis of the truing surface with reference to the axis of the spindle, and means for securing the cutter to the spindle.

8. In a gear cutting machine, the combination with a rotary spindle, of a face-mill gear cutter adapted to be loosely mounted thereon and having a cylindrical truing surface secured thereto, of a gauge mounted on the machine and adapted to be operatively engaged with the cylindrical truing surface to gauge the position of said surface as the spindle is rotated, and means for securing the cutter to the spindle.

9. In a gear cutting machine, the combination with a rotary spindle, of a face-mill gear cutter adapted to be loosely mounted thereon and having a cylindrical truing surface secured thereto, of a gauge and a screw mounted on the machine and adapted to be operatively engaged, respectively, with the cylindrical truing surface at diametrically opposite points of said surface, and means for securing the cutter to the spindle.

10. The combination with a machine having a rotary spindle journaled therein, of a rotary cutter having a plurality of cutting blades and having a truing surface which is a surface of revolution coaxial of said cutter, and a gauge which is mounted on the machine and which is adapted to be engaged operatively with the truing surface to gauge the position of the axis of the truing surface relative to the axis of the spindle as the spindle is rotated to revolve the truing surface under the gauge.

11. The combination with a machine having a rotary spindle journaled therein, of a rotary cutter having a plurality of cutting blades and having a truing surface which is a surface of revolution coaxial of said cutter, a gauge which is mounted on the machine and which is adapted to be operatively engaged with the truing surface to gauge the position of the axis of the truing surface relative to the axis of the spindle as the spindle is rotated to revolve the truing surface under the gauge, and means on the machine adapted to engage the truing surface at a point diametrically opposite the point of operative engagement of the gauge with said surface, said means being movable to adjust the cutter on the spindle to change the position of the axis of the truing surface relative to the axis of the spindle, and means for securing the cutter to the spindle.

12. The method of truing an inserted blade type face-mill gear cutter which comprises first gauging the radial positions of the blades of the cutter and adjusting them, if necessary, until they are at the correct radial distances from the axis of a surface of revolution with which the cutter is provided which is coaxial of the cutter, and then mounting the cutter on the spindle of a gear cutting machine on which the cutter is to be used, and gauging the position of said surface with reference to the axis of the spindle of the machine, and adjusting the cutter bodily, if necessary, until said surface is concentric with reference to the axis of said spindle, and then fastening the cutter to the spindle.

HERBERT G. HARTMAN.

REFERENCES CITED

The following references are of record in the file of this patent:

UNITED STATES PATENTS

| Number | Name | Date |
|---|---|---|
| 231,032 | Freienmuth | Aug. 10, 1880 |
| 1,208,852 | Sproul | Dec. 19, 1916 |
| 1,411,390 | Tibbetts | Apr. 4, 1922 |
| 1,836,662 | Head | Dec. 15, 1931 |
| 1,925,528 | Fickett | Sept. 5, 1933 |
| 2,192,343 | Earl et al. | Mar. 5, 1940 |
| 2,253,683 | Bryan | Aug. 26, 1941 |
| 2,300,340 | Carlsen | Oct. 27, 1942 |